United States Patent [19]

Inoue

[11] Patent Number: 4,585,345

[45] Date of Patent: Apr. 29, 1986

[54] DOUBLE BEAM INTERFEROMETER USING REFRACTIVE SCANNING METHOD

[75] Inventor: Masaru Inoue, Mito, Japan

[73] Assignee: Hitachi, Ltd., Tokyo, Japan

[21] Appl. No.: 587,529

[22] Filed: Mar. 8, 1984

[30] Foreign Application Priority Data

Mar. 11, 1983 [JP] Japan .................................. 58-39005

[51] Int. Cl.[4] ............................ G01J 3/45; G01B 9/02
[52] U.S. Cl. ................................................... 356/346
[58] Field of Search ................................. 356/345, 346

[56] References Cited

U.S. PATENT DOCUMENTS

| | | | |
|---|---|---|---|
| 3,109,049 | 10/1963 | Williams | 356/345 |
| 3,450,476 | 6/1969 | Rando | 356/351 X |
| 4,165,938 | 8/1979 | Doyle | 356/346 |
| 4,190,366 | 2/1980 | Doyle | 356/346 |
| 4,265,540 | 5/1981 | Doyle | 356/346 |
| 4,286,877 | 9/1981 | Clark | 356/346 |

OTHER PUBLICATIONS

"Refractively Scanned Interferometer for Fourier Transform Infrared Spectrophotometry", Doyle et al., Applied Spectroscopy, vol. 34, No. 5, 1980, pp. 599–603.

Primary Examiner—Vincent P. McGraw
Assistant Examiner—S. A. Turner
Attorney, Agent, or Firm—Antonelli, Terry & Wands

[57] ABSTRACT

A double beam interferometer using the refractive scanning method is disclosed which includes a first fixed optical body having a pair of parallel principal surfaces, a second fixed optical body having a pair principal surfaces, one of which faces and is parallel to one principal surface of the first fixed optical body, and the other of which makes a predetermined angle with the one principal surface of the second fixed optical body, a movable optical body having a pair of principal surfaces, one of which faces and is parallel to the other principal surface of the second fixed optical body, and the other of which makes the predetermined angle with the one principal surface of the movable optical body in such a manner that the predetermined angle of the second fixed optical body and the predetermined angle of the movable optical body are formed on opposite sides, driving means for moving the movable optical body on a plane containing the one principal surface of the movable optical body, a semitransparent mirror provided on one of facing principal surfaces of the first and second fixed optical bodies for dividing light from a light source into transmitted light and reflected light, and first and second reflecting mirrors for reflecting the transmitted light and reflected light in a direction opposite to an incident direction, respectively.

12 Claims, 9 Drawing Figures

DOUBLE BEAM INTERFEROMETER USING REFRACTIVE SCANNING METHOD

BACKGROUND OF THE INVENTION

1. Field of the Invention

The present invention relates to a scanning interferometer for spectrochemical analysis, and more particularly to a double beam interferometer which uses the refractive scanning method and is suitable for use in an ultrared Fourier-transform interferometer.

2. Description of the Prior Art

In a conventional scanning interferometer for spectrochemical analysis, a reflecting mirror is moved along an optical path to carry out the optical path length scanning, and therefore optical matching is not always maintained.

In order to solve this problem, the refractive scanning method has been proposed, in recent years. The advantages of this method over the conventional method in which a reflecting mirror is moved, are described in detail in, for example, an article by Doyle (Applied Spectroscopy, Vol. 53, No. 5, 1980, pages 599 to 603). Further, in a U.S. Pat. No. 4,265,540 to Doyle, it is described that a retoro-reflector such as a corner mirror or right-angled roof mirror is provided to reduce the adverse effect of the chromatic aberration caused by a wedge-shaped refractor for refractive scanning, and the retoro-reflector produces an additional effect that optical matching becomes unnecessary.

Figure 1:
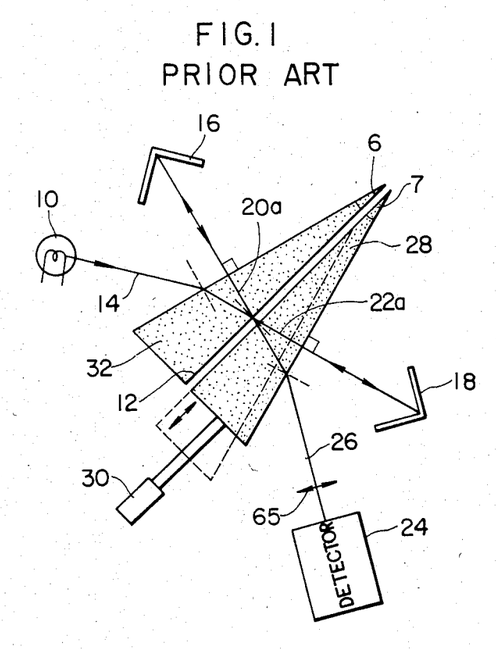
FIG. 1 is a schematic view showing the construction of an example of a conventional double beam interferometer.

FIG. 1 shows a conventional interferometer disclosed in the above-referred U.S. patent. Referring to FIG. 1, a fixed optical wedge 32 and a movable optical wedge 28 are disposed face to face with each other in such a manner that the apex angle 6 of the optical wedge 32 and the apex angle 7 of the optical wedge 28 are formed on the same side and facing surfaces of the optical wedges 32 and 28 are parallel to each other. Of the facing surfaces, that surface of the fixed optical wedge 32 which faces the movable optical wedge 28, is a semitransparent mirror surface 12. The movable optical wedge 28 can move along a plane containing that surface of the movable optical wedge 28 which faces the fixed optical wedge 32. The movement of the movable optical wedge 28 is controlled by a driving mechanism 30. Further, in a space on the fixed optical wedge side are disposed a light source 10 and a retoro-reflector 16 formed of a corner mirror. While, in a space on the movable optical wedge side are disposed a detector 24 and a retoro-reflector 18 formed of a corner mirror.

In the above-mentioned arrangement, light 14 from the light source 10 is incident on and refracted by the fixed optical wedge 32, and is then divided by the semitransparent mirror surface 12 into two parts, one of which is reflected from the mirror surface 12 and the other passes through the mirror surface 12. The light reflected from the semitransparent mirror surface 12 leaves the fixed optical wedge 32 in a direction perpendicular to the optical wedge 32, and is then incident on and reflected back from the retoro-reflector 16. The reflected light from the reflector 16 passes through the fixed optical wedge 32, the movable optical wedge 28 and a condenser system 65, and is then detected by the detector 24. While, the light having passed through the semitransparent mirror surface 12 passes through the movable optical wedge 28 and leaves the wedge 28 in a direction perpendicular thereto. The light emerging from the optical wedge 28 is incident on and reflected back from the retoro-reflector 18. The reflected light from the reflector 18 passes through the movable optical wedge 28, and is reflected from the semitransparent mirror surface 12. The reflected light from the surface 12 passes through the movable optical wedge 28 and condenser system 65, and is then detected by the detector 24.

In the above-mentioned construction, the movable optical wedge 28 is moved in directions of the arrow to vary an optical path length 22a in the movable optical wedge 28, thereby scanning the difference between an optical path length 20a in the fixed optical wedge 32 and the optical path length 22a.

Figure 2:
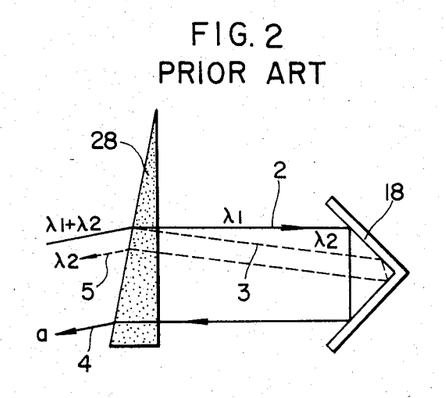
FIG. 2 is a schematic view for explaining the drawback of the conventional double beam interferometer shown in FIG. 1.

However, when light having various wavelength components impinges upon the movable optical wedge 28 in the above-mentioned arrangement, various light components pass through the optical wedges 32 and 28, and are then incident on and reflected back from the retoro-reflector 18. Now, let us consider only two light components having different wavelengths $\lambda_1$ and $\lambda_2$. As shown in FIG. 2, the two light components are different in angle of refraction from each other in accordance with the wavelength difference at the movable optical wedge 28, and therefore leave the optical wedge 28 as a light beam 2 and a light beam 3, which are reflected back, as light beams 4 and 5, from the retoro-reflector 18. That is, owing the above-mentioned dispersion, the two light beams 4 and 5 deviate from each other in a direction perpendicular to an optical axis, and thus it is not possible to prevent chromatic aberration completely. Incidentally, the fixed optical wedge 32 is omitted in FIG. 2, for brevity's sake.

SUMMARY OF THE INVENTION

An object of the present invention is to provide a double beam interferometer which uses the refractive scanning method and has a novel structure.

Another object of the present invention is to provide a double beam interferometer which uses the refractive scanning method and can sufficiently prevent chromatic aberration.

In order to attain the above objects, according to the present invention, there is provided a double beam interferometer using the refractive scanning method which comprises a light source, first and second reflecting mirrors, a detector, a first fixed optical body having a pair of parallel principal surfaces, a second fixed optical body disposed face to face with the first fixed optical body, and a movable optical body disposed face to face with and in close proximity to the second fixed optical body, and in which a semitransparent mirror surface is formed on one of the facing surfaces of the first and second fixed optical bodies, each of the second fixed optical body and movable optical body has the form of the wedge, the second fixed optical body and movable optical body are equal in apex angle of wedge to each other and are disposed in such a manner that the apex angle of the second fixed optical body and the apex angle of the movable optical body are formed on opposite sides, that surface of the second fixed optical body which faces the first fixed optical body, is always parallel to that surface of the movable optical body which faces the second reflecting mirror, and the distance between the surfaces which are always parallel, can be varied.

DESCRIPTION OF THE PREFERRED EMBODIMENTS

Figure 3:
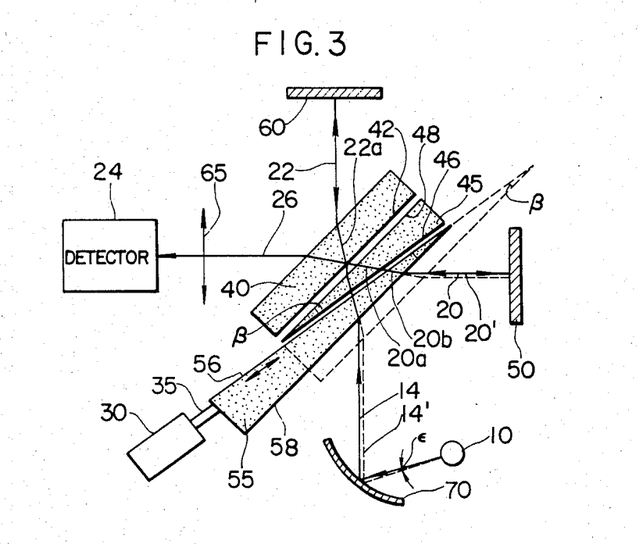
FIG. 3 is schematic view showing the construction of an embodiment of a double beam interferometer according to the present invention.

FIG. 3 shows the construction of an embodiment of a double beam interferometer using the refractive scanning method according to the present invention. Referring to FIG. 3, a semitransparent-mirror substrate 40 has the form of a rectangle, and has a pair of parallel surfaces for transmitting light. One of these surfaces is a semitransparent mirror surface 42. A fixed optical wedge 45 is disposed so that one surface 48 thereof faces and is parallel to the semitransparent mirror surface 42 of the semitransparent-mirror substrate 40. The fixed optical wedge 45 has an apex angle $\beta$. Further, a movable optical wedge 55 having the same apex angle $\beta$ as the fixed optical wedge 45 is disposed face to face with the optical wedge 45 in such a manner that the apex angle of the optical wedge 55 and that of the optical wedge 45 are formed on opposite sides, one of surfaces 56 and 58 forming the apex angle of the optical wedge 55, namely, the surface 56 faces and is parallel to the other surface 46 of the fixed optical wedge 45, and the other surface 58 of the movable optical wedge 55 is parallel to the semitransparent mirror surface 42 of the semitransparent-mirror substrate 40. The movable optical wedge 55 is coupled with a driving mechanism 30 through a reciprocating mechanism 35. That surface 56 of the movable optical wedge 55 which faces the fixed optical wedge 45, is moved or displaced on a plane containing the surface 56, by operating the driving mechanism 30. The fixed optical wedge 45 and movable optical wedge 55 are made of the same optically homogeneous material. It is desirable that the material is as transparent as possible in a wavelength range in which spectrochemical analysis is carried out. Further, in a space on the semitransparent-mirror substrate side are disposed a detector 24 and a plane mirror 60. While, in a space on the movable optical wedge side are disposed a light source 10 and a plane mirror 50. The light from the light source 10 impinges on the movable optical wedge 55 through a parabolic mirror 70. A line connecting the parabolic mirror 70 and plane mirror 60 and another line connecting the detector 24 and plane mirror 50 intersect substantially at right angles. Incidentally, a condenser system 65 is disposed between the detector 24 and semitransparent-mirror substrate 40.

The position of the movable optical wedge 55 indicated by solid lines in FIG. 3 shows the reference position of the wedge 55 in a scanning operation. When the movable optical wedge 55 is placed at this reference position, an optical path length 22a in the semitransparent-mirror substrate 40 is equal to the sum of an optical path length 20a in the fixed optical wedge 45 and an optical path length 20b in the movable optical wedge 55. Accordingly, in the case where the semitransparent-mirror substrate 40 and the optical wedges 45 and 55 are made of the same material, the thickness of the semitransparent-mirror substrate 40 becomes equal to the total thickness of the optical wedges 45 and 55 when the movable optical wedge 55 is placed at the reference position. Further, the position of the movable optical wedge 55 indicated by broken lines in FIG. 3 produces a maximum optical path difference between an optical path length 22 and an optical path length 20. The optical path length 22 is produced between the semitransparent mirror substrate 40 and plane mirror 60, and the optical path length 20 is produced between the movable optical wedge 55 and plane mirror 50. The light incident on the plane mirror 50 at a time when the movable optical wedge 55 is placed at the above position takes an optical path 20', which deviates from the optical path 20 at a time when the optical wedge 55 is placed at the reference position. However, the above deviation is very small, and can be neglected when the light is incident at right angles on the plane mirror 50. Similarly, the parallel light rays 14 traveling from the parabolic mirror 70 to the movable optical wedge 55 are deviated as indicated by a broken line 14', when the movable optical wedge 15 is placed at the position indicated by the broken lines. However, the light source 10 is generally large in size, and therefore an angle $\epsilon$ corresponding to an effective field of view is negligibly small.

The interferometer having the above-mentioned structure can function in the same manner as the conventional interferometer shown in FIG. 1. Now, explanation will be made of the reason why the present embodiment can attain the objects of the present invention.

When the refractive index of the optical wedges 45 and 55 and the moving distance of the movable optical wedge 55 are expressed by n and L, respectively, the optical path difference r due to this movement of the movable optical wedge 55 is given by the following equation:

$$r = 2L(n-1)\sin\beta \tag{1}$$

For example, in the case where an optical wedge having a refractive index n of 1.5 and an apex angle $\beta$ of 10° is used, the optical path difference r is nearly equal to 0.174L. While, in a conventional method in which a reflecting mirror is moved, a relation between the moving distance L of the reflecting mirror and the optical path difference r is given by an equation r=2L. That is, according to the present embodiment, the mechanical scanning length is increased by more than one order of magnitude, as compared with the above-mentioned conventional method. Accordingly, the fabrication accuracy of scanning mechanism and the detection accuracy of scanning position are not required to be as strict as in the conventional method.

Further, when an interference light beam is incident at a predetermined angle on an optical wedge, a light receiving area on the optical wedge has the form of an ellipse. As described in U.S. Pat. Nos. 4,190,366 and 4,165,938, in the case where only one optical wedge is used, or in the case where two optical wedges are disposed in a manner that their apex angle is formed, as shown in FIG. 1, on the same side, when light portions incident on an optical wedge at both ends of the major axis of the above ellipse emerge from the optical wedge, an optical path difference r given by the equation (1) is produced (in this case, the symbol L in the equation (1)

indicates the length of the major axis of the ellipse). The optical path difference r can be compensated by using two kinds of optical wedges, one of which has a refractive index n and an apex angle $\beta$, and the other has a refractive index n' and an apex angle $\beta'$ satisfying the following equation:

$$(n'-1) \sin \beta' = (n-1) \sin \beta \tag{2}$$

However, the refractive index of an optical material generally depends upon the wavelength of light, that is, optical materials have an optical property called "dispersion", which is inherent in optical materials. Accordingly, it is not possible to satisfy the equation (2) throughout an analytical wavelength range. In order to solve this problem, according to the present invention, a pair of optical wedges made of the same material and having the same apex angle are disposed in close proximity to each other in such a manner that the apex angle is formed on opposite sides.

In the present embodiment, a pair of optical wedges, namely, the fixed optical wedge 45 and movable optical wedge 55 are provided, in addition to the semitransparent-mirror substrate 40. Accordingly, the total thickness of the optical wedges 45 and 55 can be made smaller, as compared with such an optical wedge having a large apex angle as shown in FIGS. 3 and 4 of the previously-referred U.S. Pat. No. 4,265,540 and FIG. 7 of the previously-referred article (Applied Spectroscopy Vol. 34, No. 5, 1980, pages 599 to 603). Accordingly, the optical path length in each of the optical wedges 45 and 55 acting as refractors can be made very small, and therefore the attenuation of light due to absorption is very weak. When light is incident on an optical crystal usable in an ultrared wavelength range, the transmittance on the long wavelength side is small. Accordingly, an optical element formed of the optical crystal can be used only in a limited wavelength range. According to Lambert-Beer's law, when the optical path length in a material increases by a factor n, the absorbance of the material increases by n-th power. For example, a KBr (potassium bromide) crystal having a transmittance of 60% at an optical path length of 10 mm will have a transmittance of 26% or less at an optical path length of 30 mm. As can be seen from the above explanation, in the present embodiment, light in a wide wavelength range can pass through the optical wedges with high transmittance.

Further, in the present embodiment, the maximum thickness of each optical wedge can be made small, and therefore a change in optical path length per unit moving distance of the movable optical wedge 55 can be made small. As mentioned previously, when the mechanical moving distance and apex angle of the movable optical wedge 55 are expressed by L and $\beta$, respectively, a change in optical path length is given by $2L(n-1) \sin \beta$. That is, a ratio of the change in optical path length to the moving distance of the optical wedge 55 is equal to 0.174. Accordingly, it is not required to control the optical path scanning very strictly and to detect every scanning position very accurately. In other words, the precision, with which a change in optical path length is read in a Fourier-transform spectroscope, can be increased by a factor of ten or more, as compared with the conventional method.

Figure 4:
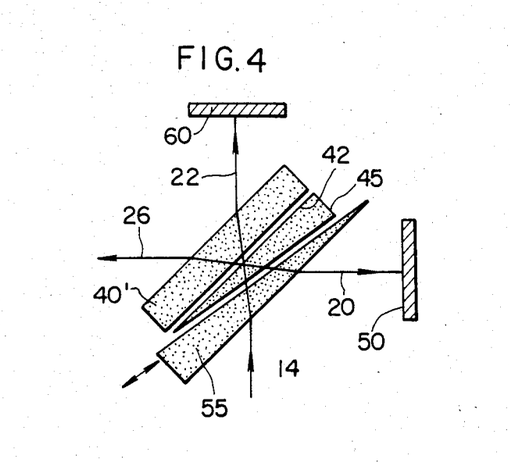
FIGS. 4 to 9 are schematic views showing the construction of other embodiments of a double beam interferometer according to the present invention.

FIG. 4 shows a main part of another embodiment of a double beam interferometer according to the present invention. In FIG. 4, the same reference numerals as in FIG. 3 designate like parts. The embodiment shown in FIG. 4 is different from that shown in FIG. 3 in that the semitransparent mirror surface 42 is formed on that surface of the fixed optical wedge 45 which faces a compensator 40'. Incidentally, in the embodiment shown in FIG. 4, the semitransparent-mirror substrate 40 shown in FIG. 3 does not have the semitransparent mirror surface 42, and therefore serves as the compensator 40' for making constant the optical path difference between two light beams divided by the semitransparent mirror surface 42, for all wavelengths of incident light.

Figure 5:
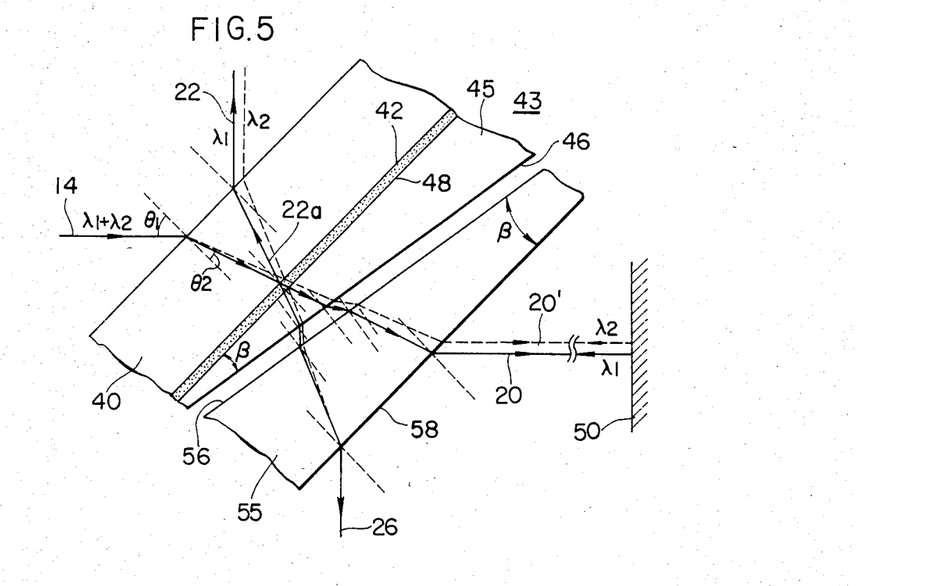

FIG. 5 is a schematic view showing a main part of a further embodiment of a double beam interferometer according to the present invention. In FIG. 5, the same reference numerals as in FIG. 3 designate like parts. The embodiment shown in FIG. 5 is different from that shown in FIG. 3 in that the semitransparent-mirror substrate 40 and fixed optical wedge 45 are united in one body at the semitransparent mirror surface 42 without leaving any air gap between the substrate 40 and optical wedge 45. FIG. 5 shows the case where the semitransparent mirror surface 42 is formed on the substrate 40, by way of example.

In the embodiment shown in FIG. 5, two parts (namely, the substrate 40 and the optical wedge 45) are changed to one united body, and thus the number of surfaces exposed to air is decreased by one. Accordingly, the optical loss due to reflection is also decreased. For ultrared spectrochemical analysis, an optical element is formed of a KBr crystal, and germanium is deposited on the surface of the KBr crystal through vacuum evaporation techniques, to form a semitransparent mirror surface. The KBr crystal is very deliquescent, and therefore a dampproofing treatment is indispensable for the KBr crystal. When the substrate 40 and the optical wedge 45 are united in one body at the semitransparent mirror surface 42, the number of dampproof surfaces is decreased. Referring now to FIG. 5, the optical elements 40, 45 and 55 are made of the same material. Further, in FIG. 5, reference numeral 14 designates incoming light, 20 a first optical path, 22 a second optical path, and 26 outgoing light. When the angle of incidence at the substrate 40 and the refractive index of the substrate 40 for a wavelength $\tilde{\lambda}$ are expressed by $\theta_1$ and $n(\tilde{\lambda})$, respectively, the angle $\theta_2$ of refraction at the substrate 40 is given by the following equation:

$$\theta_2 = \sin^{-1} (\sin \theta_1 / n(\tilde{\lambda})) \tag{3}$$

The substrate 40 is a plate having parallel principal surfaces. Further, the facing surfaces 46 and 56 of the optical wedges 45 and 55 are disposed so as to be in close proximity to and parallel to each other, and moreover the apex angle of the optical wedge 45 and that of the optical wedge 55 are both equal to $\beta$. Accordingly, the surfaces 48 and 58 of the optical wedges 45 and 55 are parallel to each other. When light including two wavelength components (namely, a $\lambda_1$-component and a $\lambda_2$-component) is incident on the substrate 40, the $\lambda_1$-component and $\lambda_2$-component travel in the substrate 40 as indicated by a solid line and a broken line, respectively, and then each of the components is divided by the semitransparent mirror surface 42 into transmitted light and reflected light. The transmitted light reaches the plane mirror 50 through the optical wedges 45 and 55, and the reflected light reaches the plane mirror 60 (not shown) through the substrate 40. When the transmitted light passes through a space between the optical wedges 45 and 55, an optical path difference is produced between the $\lambda_1$-component and $\lambda_2$-component. However, since the present embodiment is designed so that the above space is negligibly small, the $\lambda_1$-component and $\lambda_2$-component emerging from the optical wedge 55 are parallel to each other. Each of the plane mirrors 50 and 60 reflects incident light so that reflected light travels on the same optical path as the incident light, and therefore the $\lambda_1$-component and $\lambda_2$-component reflected back from each plane mirror travel so that the paths of these two components coincide with each other. Further, since the embodiment is designed so that the thickness of the substrate 40 is equal to the total thickness of the optical wedges 45 and 55 at a time when the movable optical wedge 55 is placed at the reference position, two light beams toward the detector travel on substantially the same path. Thus, the chromatic aberration due to an optical wedge can be minimized. That is, although means for correcting chromatic aberration such as a retoro-reflector is indispensable for the conventional refractive scanning method, such means is not required in the present embodiment.

Figure 6:
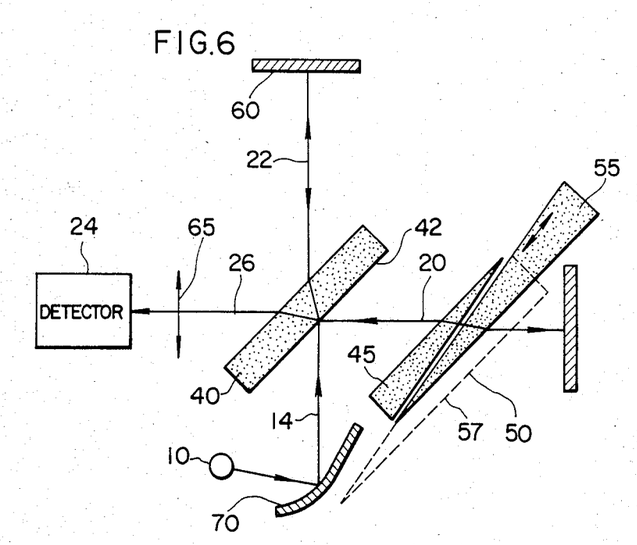

FIG. 6 shows the construction of a different embodiment of a double beam interferometer according to the present invention. In FIG. 6, the same reference numerals as in FIG. 3 designate like parts. The embodiment shown in FIG. 6 is different from the shown in FIG. 3 in that not the light from the light source 10 but the reflected light from the semitransparent mirror surface 42 is incident on the optical wedge 45, that is, only the light reflected from the semitransparent mirror surface and the reflected light thereof from the plane mirror 50 pass through the optical wedges 45 and 55.

According to the present embodiment, a number indicating how many times light passes through the optical wedges 45 and 55, is decreased by one, as compared with the embodiment shown in FIG. 3, and moreover the displacement of incident light due to the movement of the optical wedge 55 can be eliminated.

Figure 7:
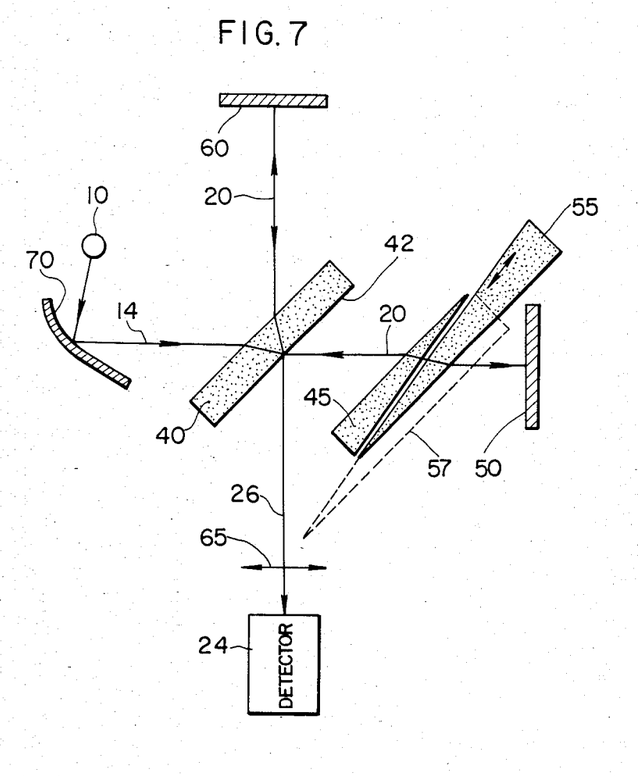

Further, still another embodiment shown in FIG. 7 can be formed by exchanging the positions of a light source part (including the light source 10 and parabolic mirror 70) and the detector 24. The embodiment shown in FIG. 7 can produce the same effects as the embodiment shown in FIG. 6.

Figure 8:
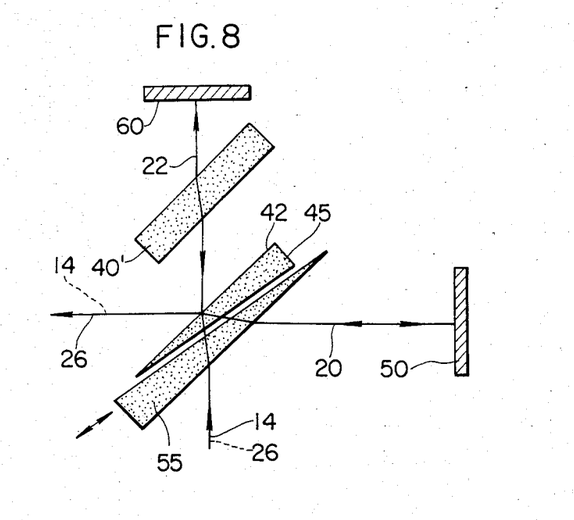

FIG. 8 shows a modified version of the embodiment shown in FIG. 4, which can produce one of the effects of the embodiment shown in FIG. 6. Referring to FIG. 8, not the light traveling toward the detector but the light having been emitted from the light source and passed through the semitransparent mirror surface 42 is incident on the compensator 40', that is, only the incoming light 14 having passed through the semitransparent mirror surface 42 and the reflected light thereof from the reflecting mirror 60 pass through the compensator 40'.

According to the arrangement shown in FIG. 8, the interference light is incident on the detector without being subjected to the adverse effect of the compensator 40' such as attenuation.

Incidentally, in FIG. 8, the positions of the light source part and detector may be exchanged, that is, the incoming light 14 and outgoing light 26 may be exchanged as indicated by reference numerals with broken lines.

The embodiments shown in FIGS. 6 to 8 do not have the advantages which are obtained by uniting the substrate 40 and fixed optical wedge 45 in one body. Now, let us assume that each optical wedge has an apex angle of 10°. In these embodiments, one optical path where light passed through an optical material having a thickness of 11 to 17 mm, is omitted, as compared with the embodiments shown in FIGS. 3 to 5. Accordingly, when light travels from the light source to the detector, a decrease in intensity of a light component corresponding to an end portion of a wavelength range in which the optical elements 40, 45 and 55 are transparent, can be made small. In the embodiments shown in FIGS. 6 to 8, in order to reduce the chromatic aberration due to the dispersion of optical material, it is desirable that the facing surfaces of the optical wedges 45 and 55 are made parallel to each other and the distance between the above facing surfaces is made small, preferably less than 1 mm.

Figure 9:
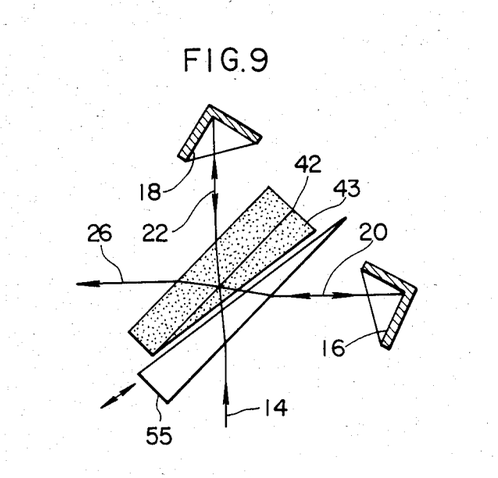

In all the above-mentioned embodiments, the plane mirrors 50 and 60 are used as the reflecting mirror. However, as shown in FIG. 9 which is a schematic view of a modified version of the embodiment shown in FIG. 5, the retoro-reflectors 16 and 18 each formed of a corner mirror may be used in place of the plane mirrors 50 and 60.

According to the present invention, the movable optical wedge for carrying out the refractive scanning and the fixed optical wedge are disposed on the same optical path, and thus the chromatic aberration due to the dispersion of optical material can be canceled. Accordingly, a double beam interferometer is obtained which can carry out the refractive scanning without using a precise, expensive retoro-reflector.

Further, according to the present invention, a pair of optical wedges and a semitransparent mirror are used. However, when the fixed optical wedge and semitransparent mirror are united in one body, not only the three optical elements are decreased to two optical elements (namely, the fixed optical wedge and the united body) but also the number of surfaces exposed to air is decreased. Thus, each of the number of reflecting surfaces causing optical loss and the number of dampproof surfaces is decreased by one.

Although, in the conventional refractive scanning means including a wedge-shaped semitransparent mirror and a movable optical wedge, it is impossible to correct the chromatic aberration due to the displacement of optical path completely by a retoro-reflector, such chromatic aberration is never produced in an interferometer according to the present invention.

It is needless to say that an interferometer for spectrochemical analysis according to the present invention has various advantages of the refractive scanning method over the scanning method in which a reflecting mirror is moved. That is, the mechanical scanning distance is increased by more than one order of magnitude, the precision required for the scanning mechanism is reduced, and the field of view is enlarged and made brighter, as compared with the scanning method in which the reflecting mirror is moved.

Further, in the present invention, a retoro-reflector may be used as a reflecting mirror. In this case, the delicate angular positioning of the reflecting mirror is not required, and therefore the effect that adjustment is not required, is exhibited for some uses.

I claim:

1. A double beam interferometer using the refractive scanning method, comprising:

a first fixed optical body having a pair of principal surfaces parallel to each other;

a second fixed optical body having a pair of principal surfaces, said principal surfaces meeting at an apex of a predetermined angle, said second fixed optical body being disposed in such a manner that one principal surface of said second fixed optical body facing said first fixed optical body is parallel to the principal surfaces of said first fixed optical body;

a movable optical body having a pair of principal surfaces, said principal surfaces meeting at an apex of said predetermined angle, said movable optical body being disposed in such a manner that one principal surface of said movable optical body facing said second fixed optical body is in close proximity to and parallel to the other principal surface of said second fixed optical body which faces said movable optical body, and said apex of said principal surfaces of said second fixed optical body and said apex of said principal surfaces of said movable optical body face in opposite directions;

means for sliding said movable optical body in a direction parallel to said one principal surface of said movable optical body facing said second fixed optical body and at least toward said apex of said movable optical body;

light source means for providing a light;

a semitransparent mirror portion provided on one of facing principal surfaces of said first and second fixed optical bodies for dividing light from said light source means into a first light beam passing through said semitransparent mirror portion and a second light beam reflected from said semitransparent mirror portion;

first and second reflecting mirrors disposed for respectively receiving said first and second light beams in an incident direction and for reflecting said first and second light beams in a direction opposite to said incident direction, respectively; and detector means disposed for detecting the interference of said first and second light beams having been reflected back from said first and second reflecting mirrors, respectively and then directed to the same optical path by said semitransparent mirror portion.

2. A double beam interferometer according to claim 1, wherein facing principal surfaces of said first and second fixed optical bodies are bonded to each other through said semitransparent mirror portion.

3. A double beam interferometer according to claim 1, wherein said first and second fixed optical bodies are disposed so as to be in close proximity to each other.

4. A double beam interferometer according to claim 3, wherein said light source means is disposed so that light from said light source means is incident on said first fixed optical body.

5. A double beam interferometer according to claim 3, wherein said light source means is disposed so that light from said light source means is incident on said movable optical body.

6. A double beam interferometer according to claim 1, wherein said first and second fixed optical bodies are disposed so as to be spaced apart from each other.

7. A double beam interferometer according to claim 6, wherein said light source means and said detector means are disposed with respect to said first and second fixed optical bodies, said movable optical body and said first and second reflecting mirrors so as to prevent said first light beam from passing through one of said first fixed optical body and the combination of said second fixed optical body and movable optical body.

8. A double beam interferometer according to claim 6, wherein said light source means and said detector means are disposed with respect to said first and second fixed optical bodies, said movable optical body and said first and second reflecting mirrors so as to prevent said second light beam from passing through one of said first fixed optical body and the combination of said second fixed optical body and movable optical body.

9. A double beam interferometer according to claim 1, wherein each of said first and second reflecting mirrors is a plane mirror.

10. A double beam interferometer according to claim 1, wherein each of said first and second reflecting mirrors is a retoro-reflector.

11. A double beam interferometer according to claim 1, wherein said light source means, said first fixed optical body, said second fixed optical body, said movable optical body, said first reflecting mirror, said second reflecting mirror and said detector means are disposed so that an optical path connecting said light source means and said first reflecting mirror for reflecting said first light beam and another optical path connecting said detector means and said second reflecting mirror for reflecting said second light beam, intersect substantially at right angles.

12. A double beam interferometer according to claim 1, wherein said light source means is disposed on one side of one of the principal surfaces of at least one of said first fixed optical body and said movable optical body and said detector means is disposed on the other side of one of the principal surfaces of said first fixed optical body and said movable optical body, said one of said first and second reflecting mirrors being disposed on the same side as said light source means with respect to said first fixed optical body and said movable optical body, and the other of said first and second reflecting mirrors being disposed on the same side as said detector means with respect to said first fixed optical body and said movable optical body.

* * * * *